United States Patent
Matsko et al.

(10) Patent No.: US 7,093,748 B1
(45) Date of Patent: *Aug. 22, 2006

(54) METHOD AND APPARATUS FOR TRACKING RETAIL PERFORMANCE METRICS DURING A TRANSACTION AT A POINT OF SALE STATION

(75) Inventors: Michael J. Matsko, Lawrenceville, GA (US); Katherine R. Lehman, Decatur, GA (US)

(73) Assignee: NCR Corporation, Dayton, OH (US)

( * ) Notice: Subject to any disclaimer, the term of this patent is extended or adjusted under 35 U.S.C. 154(b) by 368 days.

This patent is subject to a terminal disclaimer.

(21) Appl. No.: 09/629,171

(22) Filed: Jul. 31, 2000

(51) Int. Cl.
G06K 7/10 (2006.01)

(52) U.S. Cl. .................... 235/377; 235/379; 705/11; 700/174; 702/187

(58) Field of Classification Search .............. 705/8, 705/10, 16, 9, 11; 177/25; 235/377, 379; 700/174; 702/187
See application file for complete search history.

(56) References Cited

U.S. PATENT DOCUMENTS

| | | | | |
|---|---|---|---|---|
| 3,808,410 A | * | 4/1974 | Schlesinger | 705/10 |
| 4,266,271 A | | 5/1981 | Chamoff et al. | 364/200 |
| 4,328,544 A | | 5/1982 | Baldwin et al. | 364/405 |
| 4,468,750 A | | 8/1984 | Chamoff et al. | 364/900 |
| 4,524,266 A | | 6/1985 | Krakauer et al. | 235/377 |
| 4,528,679 A | * | 7/1985 | Shahbaz et al. | 377/6 |
| 4,700,295 A | * | 10/1987 | Katsof et al. | 705/10 |
| 4,930,093 A | * | 5/1990 | Houser et al. | 702/186 |
| 5,138,638 A | * | 8/1992 | Frey | 377/6 |
| 5,139,100 A | * | 8/1992 | Brauneis | 177/25.15 |
| 5,256,863 A | * | 10/1993 | Ferguson et al. | 705/21 |
| 5,305,390 A | * | 4/1994 | Frey et al. | 382/115 |
| 5,311,969 A | | 5/1994 | Dickover et al. | 186/61 |
| 5,390,107 A | * | 2/1995 | Nelson et al. | 705/10 |
| 5,410,108 A | * | 4/1995 | Williams et al. | 177/25.5 |
| 5,490,060 A | | 2/1996 | Malec et al. | 364/401 |
| 5,510,979 A | * | 4/1996 | Moderi et al. | 705/18 |
| 5,541,835 A | * | 7/1996 | Dextraze et al. | 705/10 |
| 5,557,513 A | * | 9/1996 | Frey et al. | 705/8 |
| 5,630,071 A | | 5/1997 | Sakai et al. | 395/221 |
| 5,748,899 A | | 5/1998 | Aldrich | 395/200.52 |
| 5,832,458 A | * | 11/1998 | Jones | 705/14 |
| 6,047,261 A | | 4/2000 | Siefert | 705/11 |
| 6,567,787 B1 | * | 5/2003 | Walker et al. | 705/16 |

(Continued)

FOREIGN PATENT DOCUMENTS

GB  2306025 A  *  4/1997

(Continued)

OTHER PUBLICATIONS www.retailsystems.com as archived on Jan. 17, 1999.*

(Continued)

*Primary Examiner*—Tariq R. Hafiz
*Assistant Examiner*—Peter Choi
(74) *Attorney, Agent, or Firm*—Lowe Hauptman Gilman & Berner, LLP

(57) ABSTRACT

The present invention provides a method of and apparatus for associating a retail performance metric with individual entries within a transaction and/or time type categories. The retail performance metric is determined by recording the time the system waited for and received an input. The retail performance metric type is determined as a function of the input received by the system. A retail performance metric is recorded as a function of the time the system waited for and received an input and includes a reference to the specific event causing the RPM and/or the time type category of the input.

21 Claims, 6 Drawing Sheets

U.S. PATENT DOCUMENTS 6,633,851 B1 * 10/2003 Engler et al. .................. 705/21
6,795,809 B1 * 9/2004 O'Brien et al. ................ 705/16
6,929,177 B1 * 8/2005 Matsko ........................ 705/11

FOREIGN PATENT DOCUMENTS

WO     WO-97/13229    *   4/1997

OTHER PUBLICATIONS www.acnielsen.com as archived on Oct. 1, 1999.*
Microsoft Computer Dictionary, 1994, pp. 240, 308.*
The Computer Glossary, 1995, pp. 224, 305.*
Davis, Different service firms, different core competencies, Business Horizons, Sep./Oct. 1999.v42, n5, p. 23-33 (11 pages).*
Ozeki, Customer service evaluation in the telephone service provisioning process, Dec. 1992, Winter Simulation Conference, Proceedings of the 24th conference on Winter simulation, p. 1342-1348 (8 pages).*
Grant, Computerized performance monitors as multidimensional systems: derivation and application, ACM Transactions on Information Systems, Apr. 1996, v14, n2, p. 212-235 (24 pages).*

* cited by examiner

FIG. 3a

| Entry ID | Entry Type | Time of Entry | Elapsed Time | RPM Type | Terminal Number | Operator ID | Store Number |
|---|---|---|---|---|---|---|---|
| XX05 | scan | 9:33:20 | 0:00:20 | entry id | 4 | 432 | 28 |
| XX06 | scan | 9:33:40 | 0:00:20 | entry id | 4 | 432 | 28 |
| XX07 | key | 9:34:35 | 0:00:55 | entry id | 4 | 432 | 28 |
| XX08 | scan | 9:34:55 | 0:00:20 | entry id | 4 | 432 | 28 |
| XX09 | scan | 9:35:10 | 0:00:10 | entry id | 4 | 432 | 28 |
| XX10 | weigh | 9:37:20 | 0:01:10 | prompt | 4 | 432 | 28 |
| XX11 | weigh | 9:38:40 | 0:01:20 | entry id | 4 | 432 | 28 |
| XX12 | scan | 9:39:00 | 0:00:20 | error | 4 | 432 | 28 |
| XX13 | scan | 9:39:30 | 0:00:30 | entry id | 4 | 432 | 28 |
| XX14 | scan | | | | | | |

FIG. 3b

| Entry ID | Type | Time | Terminal Number | Operator ID | Store Number |
|---|---|---|---|---|---|
| XX05 | entry id | 0:00:20 | 4 | 432 | 28 |
| XX07 | key | 9:33:40 | 4 | 432 | 28 |
| XX07 | entry id | 0:00:55 | 4 | 432 | 28 |
| XX08 | receive | 9:34:55 | 4 | 432 | 28 |
| XX08 | prompt | 0:00:45 | 4 | 432 | 28 |
| XX08 | error | 0:00:25 | 4 | 432 | 28 |
| XX08 | entry id | 0:00:05 | 4 | 432 | 28 |
| XX12 | scan | 9:35:15 | 4 | 432 | 28 |
| XX12 | entry id | 0:00:20 | 4 | 432 | 28 |
| XX13 | weigh | | 4 | | |

FIG. 3c

| Entry ID | Type | Time | Terminal Number | Operator ID | Store Number |
|---|---|---|---|---|---|
| XX05 | ring | 0:00:20 | 4 | 432 | 28 |
| XX07 | key | 9:33:40 | 4 | 432 | 28 |
| XX07 | ring | 0:00:55 | 4 | 432 | 28 |
| XX08 | receive | 9:34:55 | 4 | 432 | 28 |
| XX08 | tender | 0:00:45 | 4 | 432 | 28 |
| XX08 | non-sales | 0:00:25 | 4 | 432 | 28 |
| XX08 | tender | 0:00:05 | 4 | 432 | 28 |
| XX12 | scan | 9:35:15 | 4 | 432 | 28 |
| XX12 | ring | 0:00:20 | 4 | 432 | 28 |
| XX13 | weigh | | 4 | | |

342 → Entry ID
344 → Type
346 → Time
348 → Terminal Number
350 → Operator ID
352 → Store Number
340
354 →
356 →

FIG. 3d

| Entry ID | Entry Type | Time of Entry | Elapsed Time | Time Type Cat | Terminal Number | Operator ID | Store Number |
|---|---|---|---|---|---|---|---|
| XX06 | scan | 9:33:40 | 0:00:20 | ring | 4 | 432 | 28 |
| XX07 | key | 9:34:35 | 0:00:55 | ring | 4 | 432 | 28 |
| XX08 | scan | 9:34:55 | 0:00:20 | ring | 4 | 432 | 28 |
| XX09 | receive | 9:35:10 | 0:00:10 | tender | 4 | 432 | 28 |
| XX10 | weigh | 9:37:20 | 0:01:10 | ring | 4 | 432 | 28 |
| XX11 | weigh | 9:38:40 | 0:01:20 | ring | 4 | 432 | 28 |
| XX12 | scan | 9:39:00 | 0:00:20 | ring | 4 | 432 | 28 |
| XX13 | scan | 9:39:30 | 0:00:30 | ring | 4 | 432 | 28 |
| XX14 | scan | | | | | | |

METHOD AND APPARATUS FOR TRACKING RETAIL PERFORMANCE METRICS DURING A TRANSACTION AT A POINT OF SALE STATION

RELATED APPLICATIONS

This application is related to the following copending U.S. applications: application Ser. No. 09/629,170 entitled "Method and Apparatus for Storing Retail Performance Metrics" for Michael J. Matsko and application Ser. No. 09/629,159 entitled "Method and Apparatus for Determining the Retail Performance Metric of Entry Identification Time" for Michael J. Matsko and Katherine R. Lehman; all the above applications being filed concurrently herewith.

FIELD OF INVENTION

The present invention relates generally to a method and apparatus for associating retail performance metrics with individual entries within a transaction and/or time type categories, and more particularly, to such a method and apparatus wherein the retail performance metric is associated with 1) the specific action causing the event to occur and/or 2) a defined time type category.

BACKGROUND ART

Retail store managers continually monitor individual point of sale (POS) terminal and POS terminal operator or clerk performance for areas of improvement and error or problem detection and identification. Poor performance by either terminal or clerk impacts the overall profitability of the store. One method of monitoring is to record timing information about the clerk and POS terminal during job performance. Several approaches are available to record timing information, such as 1) software or hardware based automated time recording or 2) direct or videotaped observation and human factors engineering and analysis.

Under the first approach identified above, i.e., automated time recording, the POS terminal software records timing information about the clerk and events occurring at the terminal. However, typical retail POS terminal software retains only a small set of the overall timing information as described in copending application entitled "Method and Apparatus for Determining the Retail Performance Metric of Entry Identification Time."

Any and all recorded occurrences at the POS terminal are categorized into one of six time type categories, such as ring time, tender time, secure time, non-sales time, idle time, and no time. Categories may be added, subtracted or modified as necessary or as dictated by the store configuration. As a result of this type of time measurement, only a portion of the time spent in each of the time type categories is under direct control of the POS terminal operator. For example, the operator controls how quickly items are scanned and tenders are inputted but has no control over other actions that contribute to these time measurements. Such additional factors contributing to the time measurements include the bar code quality in the product mix presented to the operator, the types of error warning levels configured in the store, the POS terminal scanner quality, and the various tender validation requirements active at the store. For example, a store may have a policy requiring all checks being presented to be accompanied by at least two pieces of identification, or the bar code on certain products may not be of the same quality as other products and may require multiple scan attempts or keyed input for entry of the product. The additional time required is not separable from the category times nor viewable or able to be independently analyzed from the defined time type categories. Thus, there is a need in the art to enable tracking of individual occurrences within the defined time type categories.

Another problem identified in prior art systems is that the granularity of the timing information is very broad, i.e., typically the timing information is written to the transaction log (TLOG) as a single record with summarized totals for an entire transaction. Each transaction in the transaction log records the interaction of the operator and/or POS terminal with a customer and includes transaction entries recording events indicative of occurrences during the transaction. The transaction events include "scan" indicating a product bar code scan, "key" indicating a product identification using an input device, usually a keyboard, and "tender" indicating a customer providing payment. There are additional types of transaction events known in the art. Typically, a transaction entry in the transaction log includes a terminal identifier, an operator identifier, an event type, and an indication of the items purchased by the customer, if applicable. However, timing information, if recorded, is stored in the summarized time type category totals.

For example, if the operator spends three periods of time in ring time and two periods of time in secure time during a transaction, the transaction log will only reflect the total for each of the periods of time spent by the operator in secure time and ring time, but not the individual amount of time spent in each of the secure time or ring time periods for each entry or event during a transaction. In other words, if the three periods of ring time include a ten second period, a twelve second period, and a fifteen minute period, the transaction log will indicate a ring time of fifteen minutes and twenty-two seconds, possibly indicating an operator with a high ring time. In fact, the fifteen minute period may be due to operator or system errors, but is less likely to be discovered using prior approaches. Thus, to provide more accurate indications of efficiencies, and conversely, inefficiencies, there is a need in the art to enable logging of individual time period occurrences within the defined categories and/or individual transactions.

As retailers become more concerned with increasing overall system performance, increasing profits and lowering costs, it is more important to separate the high-level time measurements or time summaries of the time type categories into the individual components making up the summaries. An important portion of this time occurs during the time period when the operator is commanding the POS terminal to do something such as add a product to a customer's purchase order, otherwise known as the "entry identification" time. As used in this specification, entry identification time is the time period during which the POS terminal waits for operator input and the operator inputs a particular entry into the POS terminal or tells the POS terminal to do something. The entry identification time is the time period over which the operator has the greatest amount of control and the one that most correctly measures their performance. Thus, there is a need in the art to track a performance metric known as entry identification time.

As identified above, the second approach to solving these problems is to apply industrial or human factors engineering methods to obtain and analyze operator and POS terminal performance. These methods include time-and-motion analysis, video task analysis, and stop-watch measurements. Human factors engineering companies offer services to retailers, such as performing video data collection and task analysis on front-end check out operations. The data collected aids human factors engineers to quantify the productivity of the operator and POS terminal, identify bottlenecks, and make recommendations for POS terminal or check stand design, process changes, and technology to improve productivity. Because the human factors engineering methodology provides detailed, accurate, and quantifiable data, cost-benefit calculations can be made to demonstrate the financial impact of implementing a recommendation.

However, industrial engineering approaches and human factors engineering analysis techniques have a number of limitations. For instance, the techniques are labor intensive and costly for retailers. In order to obtain statistically valid results, a large data sample is required necessitating many hours of costly observation and analysis.

Due to the cost, typically only a small sample of data (ranging from approximately a few hours to one week's worth) is collected resulting in insufficient sample sizes which negatively affects statistical validity, interpretation of the data and quality of the results. Continuous data collection over months or years, desirable for longitudinal studies (e.g., long-term trend analysis) is cost prohibitive. The potential for human error is inherent in this type of data collection and analysis.

Thus, there exists a need in the art for a method to provide automatic, continuous, consistent, and detailed data capture of entry identification times. Any solution must capture timing information for each individual action of interest and should be linked with the transaction in which the action occurred and/or should be linked with the appropriate time type category.

SUMMARY OF THE INVENTION

Accordingly, an object of the present invention is to track a retail performance metric.

Another object of the present invention is to track individual RPM occurrences with defined categories at a POS terminal.

Another object of the present invention is to track individual RPM occurrences with transactions at a POS terminal.

Another object of the present invention is to track individual RPM occurrences with transaction entries at a POS terminal.

Another object of the present invention is to provide automatic, continuous, consistent, and detailed data capture of entry identification times.

The present invention provides a method of and apparatus for associating a retail performance metric with individual entries within a transaction and/or time type categories. The retail performance metric is determined by recording the time the system waited for and received an input. The retail performance metric type and time type category are determined as a function of the input received by the system. A retail performance metric record is recorded as a function of the time elapsed waiting for and receiving an input and the retail performance metric type and includes an identifier corresponding to an event record and/or a time type category.

In accordance with a method aspect of the invention, a computer system waits for an input. Upon receiving the input, the system determines the retail performance metric type of the input received and determines a retail performance metric which is the time elapsed waiting for and receiving an input. The system records a retail performance metric record which is a function of the retail performance metric type and the retail performance metric.

Another aspect of the invention relates to a computer system comprising a processor and a memory coupled to the processor. The memory stores sequences of instructions which, when executed by the processor, cause the processor to wait for an input. Upon receiving the input, the processor determines the retail performance metric type of the input received, and records a retail performance metric. The retail performance metric is a function of the retail performance metric type and the time elapsed waiting for and receiving the input. Further, sequences of instructions cause the processor to record the retail performance metric record and associate the retail performance metric record with an event record and/or a time type category.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

The present invention is illustrated by way of example, and not by limitation, in the figures of the accompanying drawings, wherein elements having the same reference numeral designations represent like elements throughout and wherein:

FIGS. 3a, 3b, 3c, and 3d are alternate illustrations of the contents of a portion of memory of a POS terminal of FIG. 1.

DETAILED DESCRIPTION OF THE DRAWING

A solution to the above-identified problems is by associating a retail performance metric (RPM) with either 1) the action causing the event to occur at the POS terminal or 2) one or more defined time type categories.

For the present invention, an RPM, for example, called entry identification time is determined based on a measure of time between when the POS terminal begins waiting for new input and when the POS terminal receives an entry of new input and the type of the input received, such as in the manner specified in copending application entitled "Method and Apparatus for Determining the Retail Performance Metric of Entry Identification Time" and filed on even day and hereby incorporated by reference in its entirety. For example, an entry causing an RPM may be an item being sold, a tender taken, an item identifier being keyed, or frequent shopper card number being input. Each entry occurrence is written to a transaction log recording the entry type. Each occurrence of the RPM is written to the transaction log, such as the log specified in copending application entitled "Method and Apparatus for Storing Retail Performance Metrics" and filed on even day and hereby incorporated by reference in its entirety, in such a manner as to include a reference to the transaction or transaction entry causing the RPM and/or the time type category of the RPM.

Figure 1:
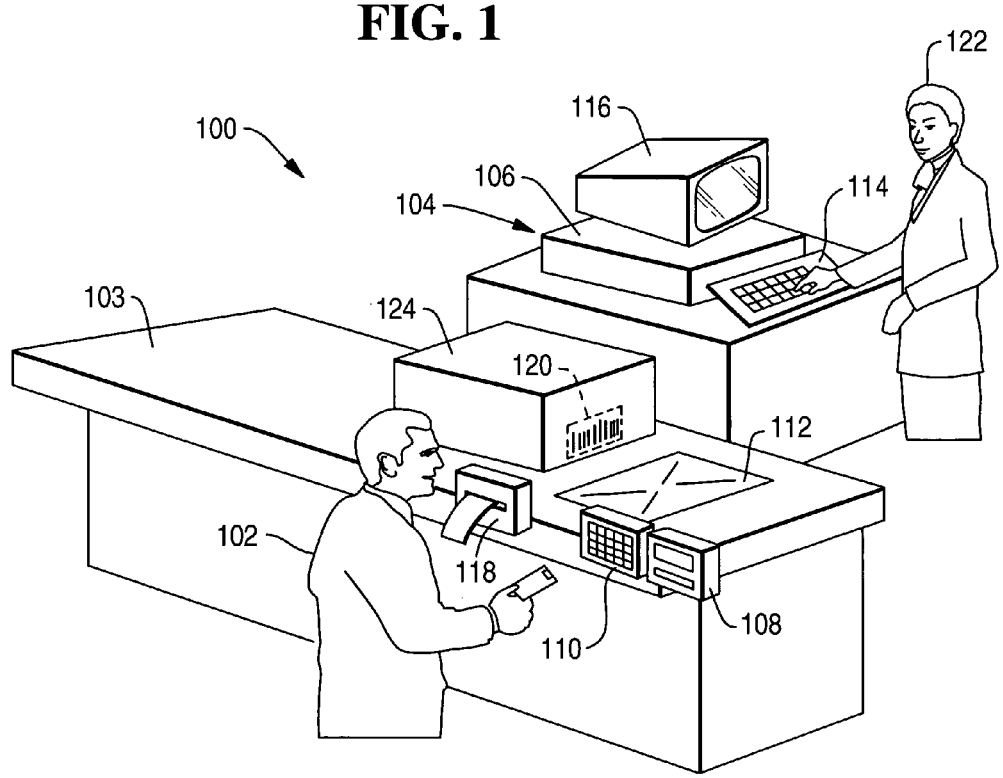
FIG. 1 is an illustration of a checkout system as used in an embodiment of the present invention.

Reference is now made to FIG. 1 wherein a checkout location, generally designated by reference numeral 100, in an area of a retail store is shown. Checkout location 100 is defined as an area where a customer 102 who has selected items from shelves or other locations in the store pays for the items selected. The checkout location 100 includes a lane or area for multiple customers to line up, a checkout counter 103, and a checkout system 104 for calculating the amount of purchases made by the customer 102 and receiving payment from the customer 102. In other words, checkout location 100 may have a conventional layout.

The checkout system 104 includes a point-of-sale (POS) terminal 106 coupled to a card interface 108, and/or a personal identification number (PIN) keypad 10 and a bar code scanner 112. The checkout system 104 can optionally include multiple POS terminals or multiple POS terminals connected to a central server (not shown) for executing sequences of instructions. Though multiple POS terminals may be used, a single POS terminal is discussed herein for simplicity.

The POS terminal 106 further includes an input device 114, preferably a keyboard for manual entry of transaction information, and an electronic display 116 for displaying product information and transaction information. The POS terminal 106 drives a printer 118, mounted on the counter 103, for printing a transaction receipt and/or balance statement and reward coupons. The card interface 108, mounted to the counter 103, communicates with the POS terminal 106 via a two way data path. The card interface 108 is adapted for physically receiving and communicating with credit cards or customer loyalty cards. In response to the customer 102 activating a sequence of keys on the PIN keypad 110 mounted to the counter 103, the PIN keypad 110 transmits a signal indicative of the customer PIN number to the POS terminal 106. The bar code scanner 112, mounted horizontally in the counter 103, scans the bar code 120 when a retail clerk 122 passes a product 124 which carries the bar code 120, in the scanner 112 field of view. The bar code scanner 112 transmits the bar code signal to the POS terminal 106 through a communication interface so the POS terminal 106 is provided with a signal uniquely indicative of the product 124 since the bar code 120 uniquely identifies the product 124. In an alternative embodiment, a self-checkout terminal may be used by a customer 102 wherein the customer 102 performs many of the functions of the clerk 122.

Figure 2:
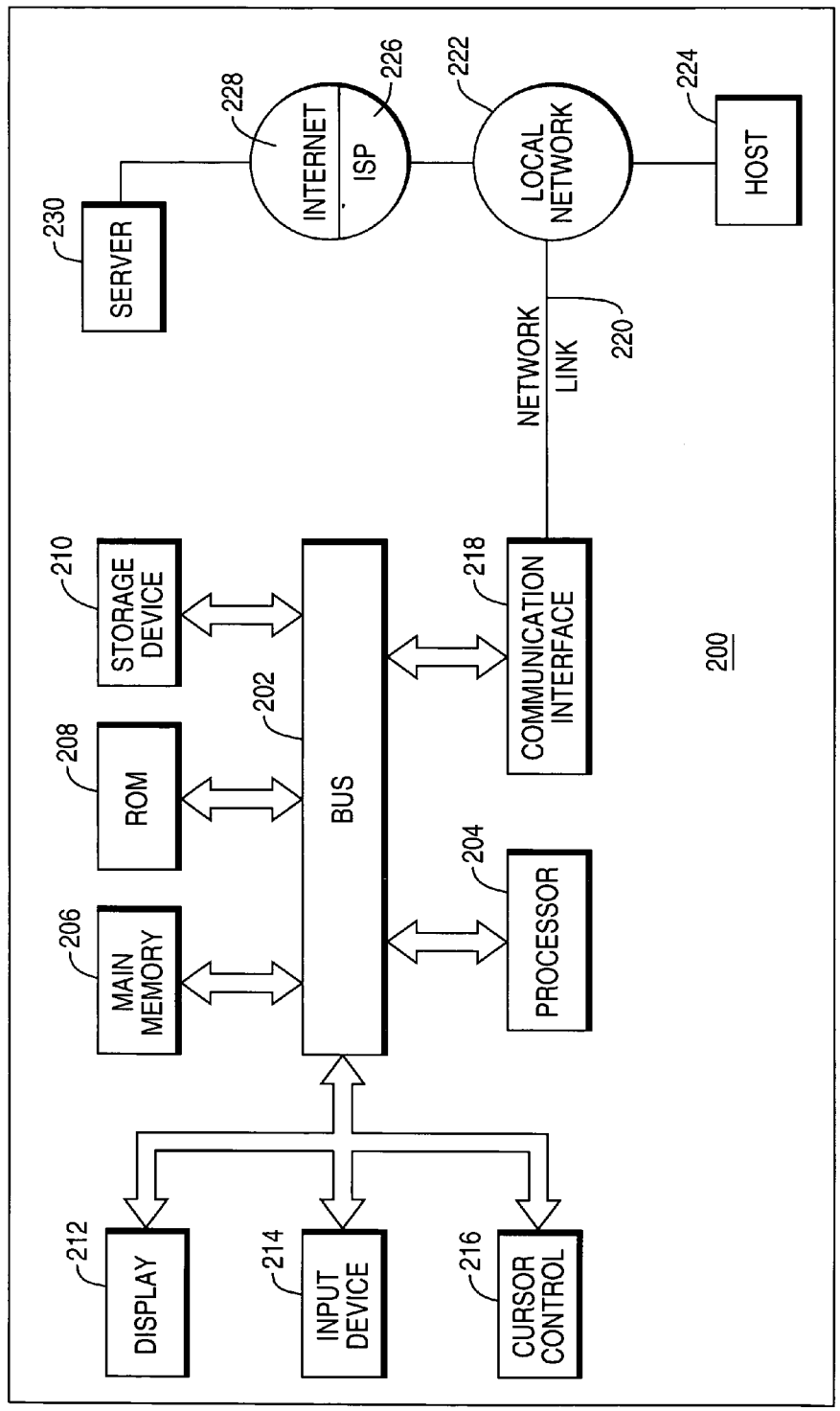
FIG. 2 is a high level block diagram of an embodiment of the present invention.

FIG. 2 is a block diagram illustrating an exemplary computer system 200 upon which an embodiment of the invention may be implemented. The present invention is usable with currently available personal computers, mini-mainframes and the like.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing product-related information (such as price, name, taxability), retail performance metric records in transaction logs (described in detail below), and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, such as a magnetic disk or optical disk, is provided and coupled to the bus 202 for storing product-related information, transaction logs and instructions.

Computer system 200 may be coupled via the bus 202 to a display 212, such as a cathode ray tube (CRT) or a flat panel display, for displaying information to checkout personnel or customer. An input device 214, including alphanumeric and function keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of computer system 200, such as the illustrated system of FIG. 2, to associate RPM records tracking clerk 122 and/or POS terminal 106 performance within defined categories with events causing the RPM record at the terminal 106. According to one embodiment of the invention, the duration of transaction entries or occurrences are tracked by computer system 200 in response to processor 204 executing sequences of instructions contained in main memory 206 in response to input received via input device 214, cursor control 216, or communication interface 218. Processor 204 obtains the RPM type from main memory 206 and compares the RPM type to the input received to determine the RPM type of the input. A transaction entry record is written to the transaction log to record the occurrence of an entry or input including the input, input type and a unique entry identifier (ID). An RPM record is written to the transaction log including a mechanism associating the RPM record with the event or transaction causing the RPM, such as including the entry ID in the RPM record or recording the RPM as a part of or extension to the entry record. Additionally, the RPM record includes a mechanism associating the RPM record with the time type category of the occurrence or transaction entry. Such instructions may be read into main memory 206 from another computer-readable medium, such as storage device 210.

However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 200 also includes a communication interface 218 coupled to the bus 202. Communication interface 208 provides two-way data communication as is known. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of the input events or occurrences triggering the recording of the retail performance metric (described below) or may permit the transmission or receipt of the RPM record for storage or analysis. For example, two or more computer systems 200 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for tracking events or occurrences within defined categories at the POS terminal 106. Additionally, the retail performance metric types and time type categories for a particular terminal 106 may be modified by a host 224 or server 230 using network link 220.

The received code may be executed by processor 204 as it is received, and/or stored in storage device 210, or other non-volatile storage for later execution. In this manner, computer system 200 may obtain application code in the form of a carrier wave.

Typically, software executing at the POS terminal has a main input processing loop. At the beginning of the loop, the software waits for input data returned from external devices, such as a keyboard 114 or scanner 112, and routes the input or entry to the appropriate software routine upon receipt of the input and writes an RPM record to a transaction log including the RPM and the RPM type. In an alternate embodiment, the RPM type may be replaced by the time type category ID or the record may include the time type category ID as an additional field. After the appropriate software routine completes, the main input processing loop returns to the beginning of the loop and waits for input data from external devices. In an alternate embodiment, the RPM record may be written to the transaction log prior to handling or routing of the entry to additional software routines.

An important part of this invention is that the RPM record is directly associated with the transaction entry record, also referred to as an entry record, in the transaction log causing the RPM to be recorded and/or the time type category of the entry. The direct association may be implemented using any of a number of software techniques including recording the entry ID or time type category ID in the RPM record or recording the RPM as part of the entry record, as described above, or recording a pointer, link (static, dynamic, or symbolic), or other software-based associative mechanism to associate the RPM record to the entry record or time type category summary in the transaction log.

FIG. 3a is an illustration of the contents of an example portion of memory of the POS terminal of FIG. 1, such as main memory 206 of FIG. 2. The contents of main memory 206, generally indicated by reference numeral 300, contains transaction information fields 302–316, respectively indicative of entry ID, entry type, time of entry, elapsed time, terminal number, operator ID, and store number. In an alternate embodiment, entry ID 302 may be replaced by time type category ID or time type category ID may be added as an additional transaction information field. Entry ID 302, entry type 304, time of entry 306, elapsed time 308, and RPM type 310 identify specific information about the entry with elapsed time 308 recording the RPM of the entry and RPM type 310 recording the RPM type of the entry. Terminal number 312, operator ID 314, and store number 316 identify the POS terminal 106 used by a particular operator (operator ID 314) in a specific store (store number 316). In this example, the RPM record information is recorded as part of the transaction entry record.

A specific transaction log record indicated by reference numeral 318 is useful as an example. As shown in FIG. 3a, log record 318 is uniquely identified by an entry ID 302 having a value of "XX07". The entry type 304 of log record 318 is "key" indicating a product being entered by keyed input using input device or keyboard 214. The time of the entry is "9:34:35" and the elapsed time of the entry, corresponding to the RPM of the entry, is recorded as "0:00:55" or 55 seconds. The operator or clerk identified by operator ID 314 having a value of "432" in store number 316 having a value of "28" keyed in the product at a terminal number 312 having a value of "4".

FIG. 3b is an illustration of an alternate embodiment of the contents of a sample portion of memory of the POS terminal of FIG. 1, such as main memory 206 of FIG. 2. The contents of main memory 206, generally indicated by reference numeral 320, contains transaction information fields 322–332, respectively indicative of entry ID, type, time, terminal number, operator ID, and store number. Entry ID 322, type 324, and time 326 identify specific information about the entry with type 324 recording either the entry type or the RPM type and with time 326 recording either the entry time or the RPM (or elapsed time). Terminal number 328, operator ID 330, and store number 332, respectively identify the POS terminal 106 used by a particular operator in a specific store. An entry record of type "key" is generally indicated by reference numeral 334.

A specific transaction log entry, in this case an RPM record, indicated by reference numeral 336 is useful as an example. As shown in FIG. 3b, log entry 336 is associated with entry record 334 by an entry ID 322 having a value of "XX07". The entry type 324 of log entry 336 is "entry id" indicating an RPM type of entry identification. The elapsed time or RPM of the entry is recorded as "0:00:55" or 55 seconds. The operator or clerk identified by operator ID 330 having a value of "432" in store number 332 having a value of "28" keyed in the product at a terminal number 328 having a value of "4". As shown in FIG. 3b, multiple retail performance metrics may be associated with one entry record.

FIG. 3c is an illustration of an alternate embodiment of the contents of a sample portion of memory or the POS terminal of FIG. 1, such as main memory 206 of FIG. 2. The contents of main memory 206, generally indicated by reference numeral 340, contains transaction information fields 342–352, respectively indicative of entry ID, type, time, terminal number, operator ID, and store number. Entry ID 342, type 344, and time 346 identify specific information about the entry with type 344 recording either the entry type or the time type category, depending on whether the record is an entry or RPM record, and with time 346 recording either the entry time or the RPM (or elapsed time). Terminal number 348, operator ID 350, and store number 352, respectively identify the POS terminal 106 used by a particular operator in a specific store. An entry record of type "key" is generally indicated by reference numeral 354.

A specific transaction log entry, in this case an RPM record, indicated by reference numeral 356 is useful as an example. As shown in FIG. 3c, log entry 356 is associated with entry record 354 by an entry ID 342 having a value of "XX07". The entry type 344 of log entry 356 is "ring" indicating a time type category of ring time. The elapsed time or RPM 346 of the entry is recorded as "0:00:55" or 55 seconds. The operator or clerk identified by operator ID 350 having a value of "432" in store number 352 having a value of "28" keyed in the product at a terminal number 348 having a value of "4".

FIG. 3d is an illustration of the contents of an example portion of memory of the POS terminal of FIG. 1, such as main memory 206 of FIG. 2. The contents of main memory 206, generally indicated by reference numeral 360, contains transaction information fields 362–376, respectively indicative of entry ID, entry type, time of entry, elapsed time, time type category, terminal number, operator ID, and store number. Time type category ID is added as an additional transaction information field. Entry ID 362, entry type 364, time of entry 366, elapsed time 368, and time type category 370 identify specific information about the entry with elapsed time 368 recording the RPM of the entry and time type category 370 recording the time type category of the entry. Terminal number 372, operator ID 374, and store number 376 identify the POS terminal 106 used by a particular operator (operator ID 374) in a specific store (store number 376). In this example, the RPM record information is recorded as part of the transaction entry record.

A specific transaction log record indicated by reference numeral 378 is useful as an example. As shown in FIG. 3d, log record 378 is uniquely identified by an entry ID 362 having a value of "XX07". The entry type 364 of log record 378 is "key" indicating a product being entered by keyed input using input device or keyboard 214. The time of the entry is "9:34:35" and the elapsed time of the entry, corresponding to the RPM of the entry, is recorded as "0:00:55" or 55 seconds. The time type category 370 of the entry is "ring" corresponding to a ring time type category. The operator or clerk identified by operator ID 374 having a value of "432" in store number 376 having a value of "28" keyed in the product at a terminal number 372 having a value of "4".

Figure 4:
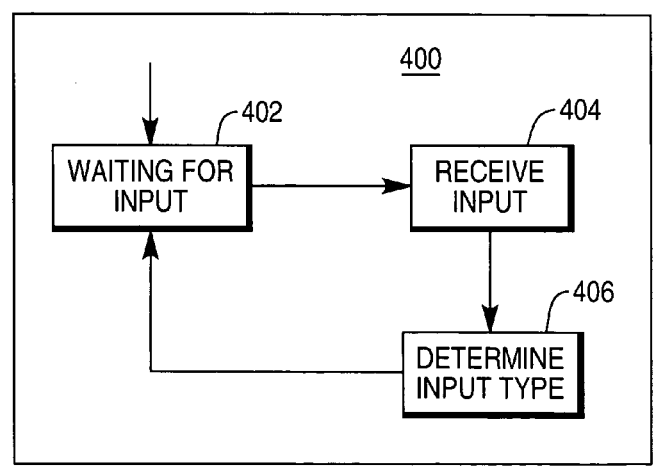
FIG. 4 is a high level flow diagram of the steps of determining the entry identification time as in a preferred embodiment.

FIG. 4 is a flow diagram of a portion of the software of an embodiment of the invention executing on POS terminal 106. A portion of the flow of the software, generally designated by reference numeral 400, begins at step 402 where the terminal 106 begins waiting for input from either keyboard 114 or bar code scanner 112 or via direct communication interface 218 from the host 224 or the server 230. Upon entering this step, the POS terminal 106 records the time in the form of a timestamp, hereinafter referred to as "start time", designating the hour, minute and second at which the terminal 106 started waiting for input. The start time is stored in either main memory 206 or on storage device 210 for later use.

When the clerk 122 scans a product 124 using scanner 112 or keys in a product's bar code 120 using keyboard 114 or performs any one of a number of events providing input to terminal 106, the flow of control proceeds to step 404 for handling the receipt of input. At the beginning of this step, the POS terminal 106 again records the time in the form of a timestamp, hereinafter referred to as "stop time", designating the hour, minute and second at which the terminal 106 received an input. The stop time and input received are stored in either main memory 206 or on storage device 210 for later use and the flow proceeds to step 406.

In step 406, the terminal determines the time type category of the event, i.e., ring time, tender time, secure time, non-sales time, idle time, or no time, and the elapsed time or duration of the event by subtracting the start time from the stop time. The elapsed time and category or RPM type, and a reference to the associated entry or category summary in the transaction log are stored as an RPM record in storage device 210. In an alternate embodiment, the start and stop time of the event could be recorded in addition to or in place of the elapsed time. Examples are shown in FIGS. 3a and 3d wherein the RPM record is stored as an additional field/s with the transaction entry and FIGS. 3b and 3c wherein the RPM record is stored as a separate record in the TLOG with a reference to either a transaction entry or a time type category. Upon completion of step 406, additional software is executed (steps not shown) to handle the processing of the event at POS terminal 106 and the flow of control returns to step 402 to record a new start time and wait for input.

An example is illustrative of the invention. The POS terminal starts waiting in the main input processing loop, such as step 402 of FIG. 4, at a start time of 9 hours, 35 minutes and 15 seconds (9:35:15). The clerk moves the customer's product past the bar code scanner so the scanner is able to scan the product's bar code. The POS terminal receives the scan or bar code information for the product scanned by bar code scanner 112 at a stop time of 9 hours, 34 minutes and no seconds (9:35:35). Subtracting the start time from the stop time results in a measured elapsed time of 20 seconds. Because the input resulted from a product scan, the POS terminal 106 determines that the operator took 20 seconds to scan the product which based on stored information corresponds to the entry identification time RPM type. The RPM record of entry identification time is then written to the transaction log in main memory of POS terminal 106 to allow for detailed analysis at a later date. The RPM record, as indicated with reference to the second record having an entry ID of XX12 as shown in FIG. 3b, includes the RPM type, i.e., entry identification in this case, the elapsed time, i.e., 20 seconds, and a reference to the transaction log record of the associated transaction entry, i.e., entry ID 322 field including a value of XX12.

In a second example, the customer places products to be purchased on the counter at the POS terminal. After the clerk scans the first few products included in the customer's order, the customer indicates to the clerk that they do not wish to purchase one of the items the clerk has scanned. The clerk activates keys on the keyboard commanding the POS terminal to perform a void on the next product scanned at the bar code scanner 112 to remove that item from the customer's order. The POS terminal then prompts the clerk to scan the item. The clerk then passes the product past the scanner 112 where the bar code is read and the product is removed from the customer's order stored in the POS terminal's memory. By comparing the event, i.e., the scanning of a voided item, with a lookup table in memory, the POS terminal determines that the event matches ring time and the RPM record is recorded in the TLOG.

Advantageously, the present invention individually captures, calculates, and records each occurrence of an entry identification RPM in the transaction log. By individually recording the entry identification RPM, the retailer is provided with accurate counts of the number of occurrences as well as the duration of the time spent in the action. With this data, the retailer can analyze the variability of the data as well as the final summation of the data.

Further, in prior approaches only broad-based time measurements are kept to produce a small collection of summary times over a single transaction. For example, most retail POS software produces 5 or 6 summary times including ring time, tender time, and lock time. Each time measurement for each action related to "ringing up" a product is added to a single value called "ring time." Likewise, the time for any action related to payment is added to a single value called "tender time." With this level of data granularity, a retailer knows the overall ring time and even the number of actions that contributed to the total ring time, but can only guess as to the extent each action contributed to the time. This is significant since many actions, although similar overall in terms of system entry definition, differ in terms of system performance. For example, scanning a UPC bar code and keying the same bar code number into a POS terminal are different methods of performing the same action but contribute differently to "ring time" since keying generally takes longer than scanning. The present invention allows for the contributions of the individual actions to be accurately measured and distinguished. Using this information, a retailer can determine the frequency and time required for an operator to key in UPC bar codes versus scanning UPC bar codes when entering items. Thus, retailers are provided with more useful information on total system performance.

Further, each RPM record contains a reference to the action causing the event to occur allowing, for example, the entry identification time RPM to be summarized over all universal product code (UPC) item inputs or separated into keyed UPC item inputs and scanned UPC inputs. Each RPM record is recorded within the context of the overall transaction in which the event occurred allowing one to consider environmental influences on the RPM data captured such as lane type, e.g., express versus regular, time of day, and transaction size.

Further advantages may be found in the following new applications described in detail below which are enabled through the use of the present invention.

Controlled tests can be run and performance evaluated for specific POS terminal components or individual operators because only those RPM records affected by a component or operator can be separated out and considered individually. For example, product or item identification times can be captured individually and by record type, e.g., coupon identification time, void identification time, department keyed identification time, scanned barcode identification time. A retailer interested in how much time is spent on keying barcodes versus scanning barcodes could capture and analyze the data required to make a decision about how barcode quality affects the retailer's bottom-line.

Retailers can assess a hardware component upgrade's effect on performance by viewing only the portion of the transaction impacted by that piece of technology. For example, two scanners could be compared by considering only the scanned barcode identification times rather than having the measure confused with other times not directly associated with the scanner, e.g., key input time, such as when only summary times and totals are used.

For instance, during preliminary tests conducted by the inventors, two similar POS terminals were configured to use the present invention. The terminals differed only in the scanner used to scan products. Subsequent analysis of the recorded RPM data revealed a twelve percent difference in the scan times of the two terminals indicating that one terminal performed better than the other. This information allows the retailer to make better decisions regarding hardware and software purchases and configuration and planning for POS terminals.

By using the present invention, operator performance is more accurately assessed because only the actions that operators have direct control over are able to be extracted. For example, under prior approaches, operators were able to artificially inflate their performance measure, e.g., items per minute, by stopping the ring time clock, and effectively shortening the ring time, by putting the system into secure mode. Additionally, under previous approaches, operators could be unfairly compared on performance of unequal transaction mixes, i.e., unequal ratios of keyed items and scannable items. Using the present invention, all operators can be evaluated based on a consistent measure. This is particularly useful for making decisions about training and training needs, operator performance reviews, and obtaining accurate data to drive labor scheduling programs.

Current POS terminal software reports provide indications about performance problems existing, but offer no information about which part of the operator or POS terminal is contributing to the problem. Using the present invention, a retailer can easily isolate the source of the problem because each individual action is measured and recorded. Therefore, the present invention can be used as a diagnostic tool. For example, reports disclosing a significant increase in scan time in terminal lane 3 could enable a retailer to direct attention to the scanner to check for potential problems. In contrast, under previous approaches, the retailer might notice increases in items per minute metrics, but would not know which part of the operator/POS terminal was causing the increase. More likely, under prior approaches, the problem would not be realized, because different operators' performance on the scanner would mask the performance of the device.

Further still, retailers can run "live" experiments in the store to test new hardware or software, to assess physical layouts, or to try different staffing arrangements. Retailers can easily compare data before and after any changes to evaluate the gain or loss in performance attributable to the change without introducing extraneous factors in the data.

Using the present invention, the data captured could easily be used as input to simulation models. Typically, retailers have difficulty taking advantage of the power of simulation tools because they do not have the required level of detail of data to drive the models. For example, retailers could use modeling techniques driven by the data from the invention to assess different combinations of lane configurations and labor scheduling on overall store performance. A retailer could compare the effect of staffing the store with 1 express lane and 4 regular lanes compared to 2 express lanes and 3 regular lanes to evaluate the tradeoff between customer service (customer queues), productivity, and labor costs.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A computer implemented method of tracking a plurality of retail performance metric records for different types of events within a transaction and recording a transaction entry record, the method comprising the steps of:
   receiving inputs for a plurality of different types of events occurring at a point of sale (POS) station during a transaction, wherein the types of events occurring at the POS station comprise at least scan operations, and key operations;
   recording retail performance metric records for the plurality of different types of events, each retail performance metric record associating an event type and a time related to performance of the event;
   associating the retail performance metric records with a transaction entry record; and
   recording the transaction entry record indicative of the transaction, said transaction entry record associating retail performance metrics for at least two different types of events occurring within the transaction, said at least two different types of events including at least one scan operation and at least one key operation.

2. The method of claim 1, wherein the associating step comprises combining the retail performance metric record with the transaction entry record.

3. The method of claim 1, wherein the transaction entry record includes a unique entry identifier value and the associating step comprises including the unique entry identifier value of the transaction entry record with the retail performance metric record.

4. The method of claim 1, wherein the associating step comprises adding a pointer to the retail performance metric record, wherein the pointer references the transaction entry record.

5. The method of claim 1, wherein the associating step comprises adding a link to the retail performance metric record, wherein the link references the transaction entry record.

6. The method of claim 2, wherein the transaction entry record after addition of the retail performance metric record comprises an entry identifier field, an entry type field, a time of entry field, and an elapsed time field.

7. A computer implemented system for tracking a plurality of retail performance metric records for different types of events within a transaction, the system comprising:
   a processor for receiving and transmitting data; and
   a memory coupled to the processor, the memory having stored therein sequences of instructions which, when executed by the processor, cause the processor to receive inputs for a plurality of different types of events occurring at a point of sale (POS) station during a transaction, wherein the types of events occurring at the POS station comprise at least scan operations, and key operations, record retail performance metric records for the plurality of different types of events, the processor associating an event type and a time related to performance of the event for each retail performance metric record, associating the retail performance metric record with a transaction entry record, and recording the transaction entry record indicative of the transaction, said transaction entry record associating multiple retail performance metrics for different types of events occurring within the transaction, said different types of events including at least one scan operation and at least one key operation.

8. The system of claim 7, wherein the memory further includes sequences of instructions which, when executed by the processor, cause the processor to combine the retail performance metric record with the transaction entry record.

9. The system of claim 7, wherein the memory further includes sequences of instructions which, when executed by the processor, cause the processor to include an entry identifier value in the transaction entry record and to associate the retail performance metric record with the entry record by including the entry identifier value of the transaction entry record in the retail performance metric record.

10. The system of claim 7, wherein the memory further includes sequences of instructions which, when executed by the processor, cause the processor to associate the retail performance metric record to the transaction entry record by adding a pointer to the retail performance metric record wherein the pointer references the transaction entry record.

11. The system of claim 7, wherein the memory further includes sequences of instructions which, when executed by the processor, cause the processor to associate the retail performance metric record to the transaction entry record by adding a link to the retail performance metric record wherein the link references the transaction entry record.

12. The system of claim 8, wherein the entry record after combination with the retail performance metric record comprises an entry identification field, an entry type field, a time of entry field, and an elapsed time field.

13. A computer implemented method of tracking a plurality of retail performance metric records for different types of events within a transaction, the method comprising the steps of:
   receiving inputs for a plurality of different types of events occurring at a point of sale (POS) station during a transaction, wherein the types of events occurring at the POS station comprise scan operations, weighing operations, key operations, or tender operations;
   recording a transaction entry record indicative of the transaction;
   determining time type categories of the events received;
   recording retail performance metric records for the plurality of different types of events, each retail performance metric record associating a time type category and the time related to performance of the event, the time type category is a time category indicating ring time, tender time, secure time, non-sales time, idle time, or no time;
   associating the retail performance metric records with the time type categories; and
   recording the transaction entry record indicative of the transaction, said transaction entry record associating multiple retail performance metrics for at least two different types of events occurring within the transaction.

14. The method of claim 13, wherein the associating step comprises adding a pointer to the retail performance metric record, wherein the pointer references a time type category.

15. The method of claim 13, wherein the associating step comprises adding a link to the retail performance metric record, wherein the link references a time type category.

16. A computer implemented system for tracking a plurality of retail performance metric records for different types of events within a transaction, comprising:

a processor for receiving and transmitting data; and a memory coupled to the processor, the memory having stored therein sequences of instructions which, when executed by the processor, cause the processor to receive inputs for a plurality of different types of events occurring at a point of sale (POS) station during a transaction, wherein the types of events occurring at the POS station during the transaction comprise a scan operation, a weighing operation, a key operation, and a tender operation, the processor recording a transaction entry record indicative of the transaction, determining time type categories of the events received, recording retail performance metric records for the plurality of different types of events, associating a time type category and the time related to performance of the event for each retail performance metric record, wherein the time type category is a time category indicating ring time, tender time, secure time, non-sales time, idle time, or no time, the processor associating retail performance metric records with the time type categories, and recording the transaction entry record indicative of the transaction, said transaction entry record associating multiple retail performance metrics for at least two different types of events occurring with the transaction, the at least two different types of events including at least one scan operation and at least one key operation.

17. The system of claim 16, wherein the memory further includes sequences of instructions which, when executed by the processor, cause the processor to associate each retail performance metric record to the time type category by adding a pointer to the retail performance metric record wherein the pointer references the time type category.

18. The system of claim 16, wherein the memory further includes sequences of instructions which, when executed by the processor, cause the processor to associate the retail performance metric record to the time type category by adding a link to the retail performance metric record wherein the link references the time type category.

19. A computer implemented method of tracking a plurality of retail performance metric records for different types of events within a transaction, the method comprising the steps of:

receiving inputs for a plurality of different types of events occurring at a point of sale (POS) station during a transaction, wherein the types of events occurring at the POS station comprise scan operations, weighing operations, key operations, or tender operations;

recording a transaction entry record indicative of the transaction;

determining time type categories of the input received;

recording retail performance metric records for the plurality of different types of events, each retail performance metric record associating the retail performance metric type, the time type category and the time related to performance of the event, the time type category is a time category indicating ring time, tender time, secure time, non-sales time, idle time, or no time;

associating retail performance metric records with the transaction entry record and with the time type categories; and recording the transaction entry record indicative of the transaction, said transaction entry record associating multiple retail performance metrics for at least two different types of events occurring within the transaction.

20. A computer implemented system for tracking a plurality of retail performance metric records for different types of events within a transaction, the system comprising:

a processor for receiving and transmitting data; and a memory coupled to the processor, the memory having stored therein sequences of instructions which, when executed by the processor, cause the processor to receive inputs for a plurality of different types of events occurring at a point of sale (POS) station during a transaction, wherein the types of events occurring at the POS station during a transaction comprise a scan operation, a weighing operation, a key operation, and a tender operation, the processor recording a transaction entry record indicative of the transaction, determining time type categories of the events received, recording retail performance metric records for the plurality of different types of events, associating a retail performance metric type, a time type category and the time related to performance of the event for each retail performance metric record, wherein the time type category is a time category indicating ring time, tender time, secure time, non-sales, idle time and no time, the processor associating retail performance metric records with the time type categories and the entry record, and recording the transaction entry record indicative of the transaction, said transaction entry record associating multiple retail performance metrics for at least two different types of events occurring with the transaction, the at least two different types of events including at least one scan operation and at least one key operation.

21. A computer implemented method of tracking performance of different types of events within a transaction, the method comprising:

determining a start and a stop time for a first event of a first type from a plurality of different types of events occurring at a point of sale (POS) station during a transaction, wherein the types of events comprise at least scan operations and key operations;

determining the type of the first event;

associating the type and an elapsed time related to performance of the first event in a retail performance metric for the first event;

determining a start and a stop time for a second event of a second type;

determining the type of the second event;

associating the type and an elapsed time related to performance of the second event in a retail performance metric for the second event; and storing the retail performance metric for the first event and the retail performance metric for the second event in a transaction record for the transaction.

* * * * *